(12) United States Patent
Lan et al.

(10) Patent No.: US 11,015,445 B2
(45) Date of Patent: May 25, 2021

(54) ELECTROCHEMICAL SENSING USING OPTICAL SYSTEMS WITH ELECTROCHEMICAL PROBES FOR WELLBORE APPLICATIONS

(71) Applicant: Halliburton Energy Services, Inc., Houston, TX (US)

(72) Inventors: Xinwei Lan, Spring, TX (US); Yenny Natali Martinez, Houston, TX (US); Michel Joseph LeBlanc, Houston, TX (US); Neal Gregory Skinner, Lewisville, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 179 days.

(21) Appl. No.: 16/326,830

(22) PCT Filed: Oct. 3, 2016

(86) PCT No.: PCT/US2016/055179
§ 371 (c)(1),
(2) Date: Feb. 20, 2019

(87) PCT Pub. No.: WO2018/067113
PCT Pub. Date: Apr. 12, 2018

(65) Prior Publication Data
US 2019/0226335 A1 Jul. 25, 2019

(51) Int. Cl.
*E21B 47/12* (2012.01)
*E21B 49/08* (2006.01)
(Continued)

(52) U.S. Cl.
CPC ............ *E21B 49/08* (2013.01); *E21B 47/135* (2020.05); *G01N 27/414* (2013.01);
(Continued)

(58) Field of Classification Search
CPC .. E21B 47/123; E21B 49/08; E21B 2049/085; E21B 47/135; E21B 49/0875;
(Continued)

(56) References Cited

U.S. PATENT DOCUMENTS

| 2,930,967 A | 3/1960 | Laird et al. |
| 3,294,652 A | 12/1966 | Banks, Jr. et al. |

(Continued)

FOREIGN PATENT DOCUMENTS

EP 0374985 A1 6/1990

OTHER PUBLICATIONS

Hughes, T. L, et al. "Rigsite Ions Monitoring System for Drilling Fluids." SPE/IADC Drilling Conference. Society of Petroleum Engineers, 1993. (SPE/IADC 25703).

(Continued)

*Primary Examiner* — Daniel P Stephenson
(74) *Attorney, Agent, or Firm* — Thomas Rooney; Baker Botts L.L.P.

(57) ABSTRACT

A property of a downhole fluid, for example, a chemical species or ion concentration, may be accurately determined and logged based on measurements received from an optical detector where the optical detector is fed information or signals from an optical system coupled to one or more electrochemical probes calibrated for one or more properties of a fluid. The one or more electrochemical probes provide a potential to the optical system based, at least in part, on exposure to the downhole fluid. The optical system receives an optical signal from a light source that is transmitted via a transmission line, such as a fiber optic cable. Downhole information from the optical system is transmitted to the surface via the same or another transmission line. Thus, the signals are in the optical domain rather than the electrical (Continued)

domain. Multiple properties may be measured simultaneously using the same transmission line.

22 Claims, 7 Drawing Sheets (51) Int. Cl.
*G01N 27/414* (2006.01)
*G01N 27/416* (2006.01)
*G01V 8/10* (2006.01)
*G01V 8/12* (2006.01)
*E21B 47/135* (2012.01)

(52) U.S. Cl.
CPC ........... *G01N 27/4166* (2013.01); *G01V 8/10* (2013.01); *G01V 8/12* (2013.01); *E21B 49/0875* (2020.05)

(58) Field of Classification Search
CPC .... G01N 27/414; G01N 27/4166; G01V 8/10; G01V 8/12
See application file for complete search history.

(56) References Cited

U.S. PATENT DOCUMENTS

| | | | |
|---|---|---|---|
| 3,855,097 A | 12/1974 | Sharp et al. | |
| 4,052,285 A | 10/1977 | Dobson | |
| 4,241,997 A * | 12/1980 | Chraplyvy | G01N 21/39 356/243.1 |
| 5,535,293 A * | 7/1996 | Buchin | G02B 26/04 250/227.21 |
| 6,437,326 B1 * | 8/2002 | Yamate | E21B 47/113 250/269.1 |
| 6,740,216 B2 | 5/2004 | Diakonov et al. | |
| 7,675,030 B2 * | 3/2010 | Vannuffelen | G01J 3/4338 250/269.1 |
| 7,901,555 B2 | 3/2011 | Jiang et al. | |
| 8,596,354 B2 | 12/2013 | Hartshorne et al. | |
| 9,983,276 B2 * | 5/2018 | Stokely | E21B 7/024 |
| 2004/0239923 A1 * | 12/2004 | Adams | G01J 3/28 356/317 |
| 2007/0109537 A1 * | 5/2007 | Vannuffelen | G01J 3/433 356/326 |
| 2008/0087078 A1 | 4/2008 | VanNuffelen et al. | |
| 2009/0032303 A1 | 2/2009 | Johnson | |
| 2009/0178921 A1 * | 7/2009 | Lawrence | E21B 49/08 204/400 |
| 2012/0064632 A1 | 3/2012 | Robinson et al. | |
| 2013/0087328 A1 | 4/2013 | Maida, Jr. et al. | |
| 2016/0208605 A1 | 7/2016 | Morrow et al. | |
| 2017/0102370 A1 * | 4/2017 | Alber | G01N 21/78 |
| 2019/0226335 A1 * | 7/2019 | Lan | G01V 8/12 |

OTHER PUBLICATIONS

International Search Report and Written Opinion issued in related PCT Application No. PCT/US2016/055179 dated Jun. 15, 2017, 17 pages.

* cited by examiner

ELECTROCHEMICAL SENSING USING OPTICAL SYSTEMS WITH ELECTROCHEMICAL PROBES FOR WELLBORE APPLICATIONS

CROSS-REFERENCE TO RELATED APPLICATION

The present application is a U.S. National Stage Application of International Application No. PCT/US2016/055179 filed Oct. 3, 2016, which is incorporated herein by reference in its entirety for all purposes.

BACKGROUND

The present disclosure relates generally to well drilling operations and, more particularly, to downhole chemical sensors, for example electrochemical sensors, for obtaining downhole parameters.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Certain chemical compositions downhole may be indicative of corrosion of downhole components. Accurate measurements to predict such corrosion may be beneficial to prolonging the life of downhole components. An ion selective electrode (ISE) or specific ion electrode (SIE) is a transducer or sensor that coverts the activity of a specific ion dissolved in a solution into an electrical potential which may be measured by a voltmeter. Ion selective field-effect transistors (ISFET) were developed as an alternative to the ISE. ISFETs are generally small in size, solid-state in nature, may be mass fabricated, and may have a short response time and low output impedance. Such electrodes have been used to measure the concentration of a selected ion or class of ions in drilling fluid, such as drilling mud composition. Systems incorporating such electrodes use traditional voltammetry measurement methods through a voltmeter or pH meter and then convey the electrical signal to the surface with a series of electronic device and long electrical cables. Measurements received from traditional systems may be unreliable or inaccurate due to noise and may require any one or more of amplifiers, analog to digital (A/D) converters and power supplies which increase costs.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to downhole chemical sensors, for example electrochemical sensors, for obtaining downhole parameters.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, waveguides, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), otherwise nonlinear wellbores in any type of subterranean formation or any combination thereof. Embodiments may be applicable to injection wells, production wells, including natural resource production wells such as hydrogen sulfide, hydrocarbons or geothermal wells, as well as borehole construction for river crossing tunneling and other such tunneling boreholes for near surface construction purposes or borehole u-tube pipelines used for the transportation of fluids such as hydrocarbons, or any combination thereof. Embodiments described below with respect to one implementation are not intended to be limiting.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or local area network (LAN). Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

There exist different approaches for obtaining downhole measurements, including chemical composition measurements. Potentiometric related electrochemical sensors may be based on ion selective electrode (ISE) (also known as specific ion electrode (SIE)) and ion selective field-effect transistor (ISFET) sensors. These sensors are transducers that convert the activity of a specific ion dissolved in a solution into an electrode potential, which may be measured, for example, by a voltmeter. Due to the real time ion concentration monitoring capability, inexpensive setup, and immunity to color or turbidity in the sample, both ISE and ISFET are used in various fields, including clinical diagnostics, industrial process control, environmental monitoring, and downhole operations. Any one or more of other types of electrochemical sensitive probes or electrodes may be utilized instead of ISE and ISFET sensors including, but not limited to those based on atomic interaction or molecular interaction mechanisms (for example, electrochemical impedance or polarographic probes).

Electro-optical transducers or devices or electrically driven optical sources or devices may be used to transfer the electrical signal to an optical signal by either modulating or generating a signal output. This signal output is in the optical domain instead of the electrical domain as the prior ISE and ISFET sensors. This signal output which is related to some chemical information experienced, for example, downhole, may be conveyed to the surface from the wellbore through an optical fiber. Advantages of such an optical measurement include, but are not limited to, in-situ measurement ability with reduction and in some instances elimination of electrical noise, amplifiers, analog to digital (A/D) converters, power supplies and any other factors or components known to one of ordinary skill in the art. Also, multiplexed sensing capability is provided as discussed in more detail below.

In one or more embodiments, the fiber integrated electrochemical sensors may be used with a drilling system to perform in-situ, real time chemical measurements of drilling fluid and mud, as well as formation property logging. Any one or more embodiments may be used in conjunction with a wireline tool, for example, Halliburton Reservoir Description Tool (RDT™), to characterize and identify formation fluids, tracer fluids (for example, tracer fluids injected at other wells or other locations in the present well and produced through perforations 26), or any other type of fluids by offering information related to a property of the fluid, such as pH and ion concentration information or any other property of the fluid. Such may be particularly applicable for various key processes of the hydrocarbon production, for example, prediction and assessment of mineral scale and corrosion, characterization of water breakthrough, obtaining the water cut ratio, helping in the strategic planning about water/oil separation and water reinjection, and supporting water/CO$_2$/chemical injection tracing, or any others known to one of ordinary skill in the art.

Figure 1:
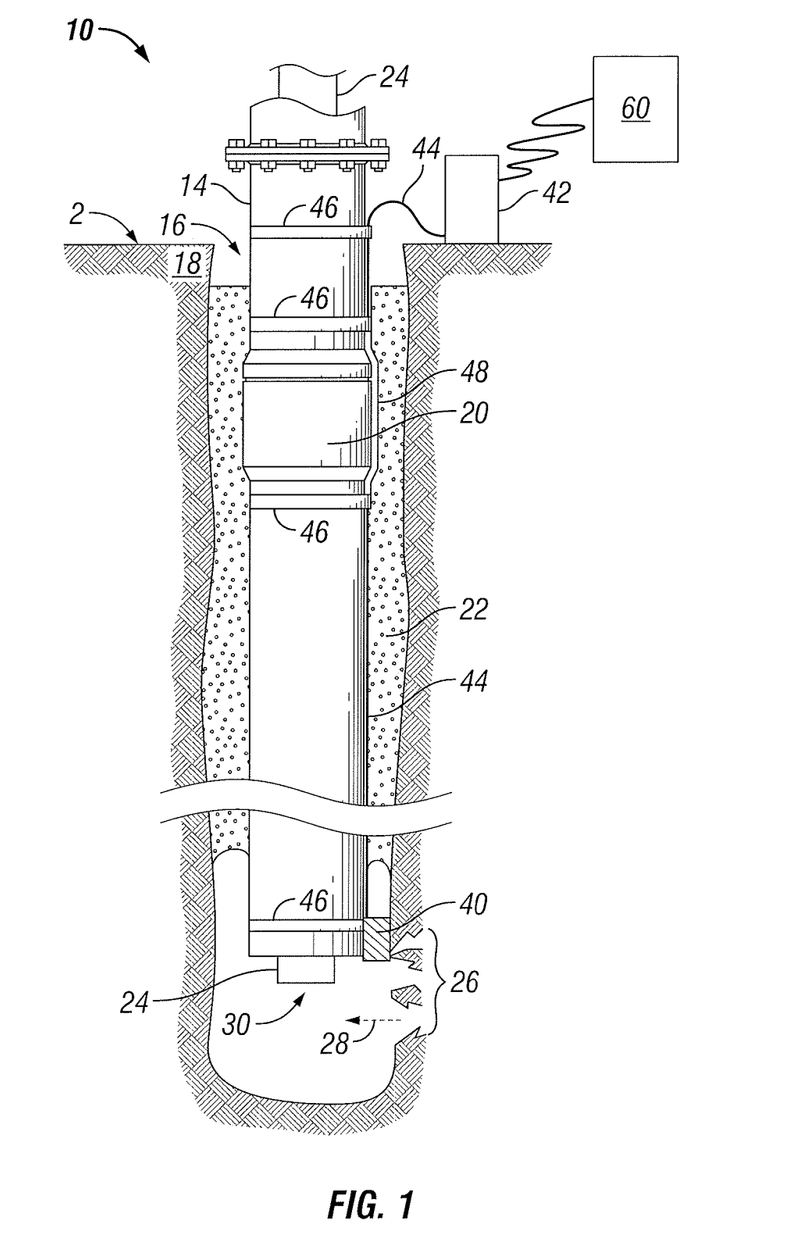
FIG. 1 is a diagram illustrating an example electrochemical optical sensor system, according to one or more aspects of the present disclosure.

FIG. 1 is a diagram illustrating an example electrochemical optical sensor system, according to aspects of the present disclosure. A well 10 is equipped with an illustrative embodiment of an electrochemical optical sensor system. The well 10 may be constructed and completed in any manner known to one of ordinary skill in the art. The well 10 includes a casing string 14 positioned in a borehole 16 that has been formed in the formation 18 by a drill bit (not shown). The casing string 14 includes multiple tubular casing sections that may be any length coupled or connected end-to-end by couplings. Within the well 10, cement 22 may be injected between an outer surface of the casing string 14 and an inner surface of the borehole 16. The cement 22 may be allowed to set. A production tubing string 24 may be positioned in an inner bore of the casing string 14.

The well 10 is adapted to guide a fluid 28, for example, a production fluid such as a hydrocarbon such as oil or gas or any other type of fluid, from a bottom of the borehole 16 to a surface 2 of the formation 18. Perforations 26 may be formed within the borehole 16 to facilitate the flow of a downhole fluid, such as fluid 28, for example, a production fluid, a formation fluid, a fluid from another well or wells, a tracer fluid, or any other fluid, into the borehole 16 and on to the surface 2 via an opening 30 at the bottom of the production tubing string 24. In one or more embodiments, perforations or openings may be located at any one or more suitable location so as to permit a fluid to flow into the borehole 16. In any embodiment, well 10 or any other well may be used. The optical system 40 may sense the fluid 28 from any number of paths associated with the formation 18 (for example, perforations 26), the borehole 16, the casing string 14, or any other manner associated with the formation 18 or any other downhole components.

The components of casing string 14 may be made of steel, an alloy that is mostly iron. During operation of the well 10, the fluid 28 carries a certain amount of other fluid (such as water) into the borehole 16 and along the fluid flow path to the surface 2. This produced water may include chemical species that cause scale buildup, corrosion or both in the components of the casing string 14. It may be advantageous to identify a property (such as the chemical species or ion concentration) of the fluid 28 to more efficiently operate the well 10. The electrochemical optical sensor system may detect concentrations of one or more chemical species in the fluid 28 including, but not limited to, corrosive chemicals, chemicals that promote scaling, scale inhibitor substances or compounds introduced into the fluid 28, or any other chemical substances or compositions.

Figure 3:
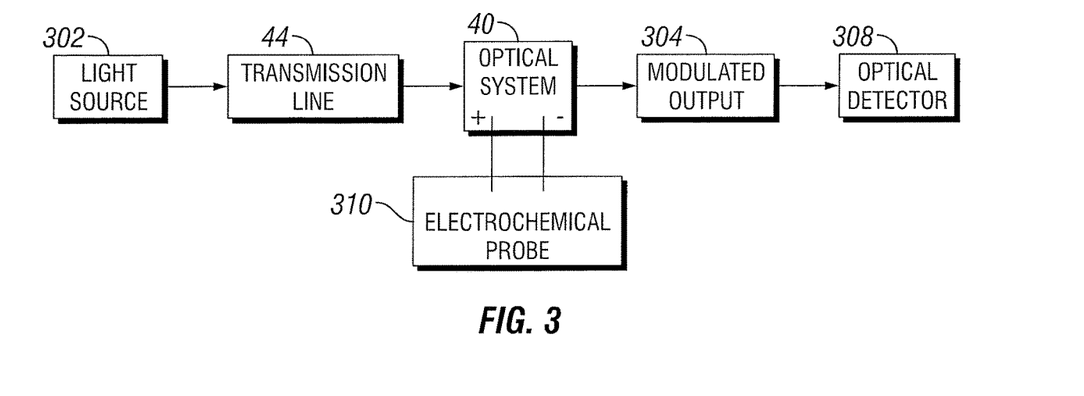
FIG. 3 is a diagram illustrating an example system for electrochemical sensing of one or more chemical species, according to aspects of the present disclosure.

In one or more embodiments, the electrochemical optical sensor system may include an optical system 40 coupled to an electrochemical probe (element 310 as illustrated in FIG. 3) or including an electrochemical probe which is exposed to a fluid, for example, the fluid 28 within the borehole 16, an information handling system 60, a transmission line 44 and any other component required for a given operation. The optical system 40 is coupled to an interface 42 via a transmission line 44. The transmission line 44 may permit high speed transmission and may also provide a low loss optical transmission to the surface 2 or interface 42. While interface 42 is shown at surface 2, in one or more embodiments, interface 42 may be located within the borehole 16. In one or more embodiments, interface 42 may be coupled to a telemetry system (not shown) associated with the transmission line 44, and the telemetry system may convey the information of the transmission line 44 to the interface 42 at the surface 2 and then on to the information handling system 60. In one or more embodiments, information conveyed via transmission line 44 may be transmitted to an information handling system 60 using any other system suitable for a given operation. In one or more embodiments, the transmission line 44 may comprise free space. In one or more embodiments, the transmission line 44 may be a fiber optic cable or line that includes at least one optical fiber that may be exposed by pulling back the cable sheath. The optical fiber of the transmission line 44 may include a substantially transparent inner core surrounded by a substantially transparent cladding layer with the core having a higher index of refraction, which causes the optical core to serve as a waveguide. The cladding layer of the transmission line 44 is in turn surrounded by one or more protective layers that prevent external gases and liquids or any external fluids from degrading the performance of the transmission line 44. In one or more embodiments, transmission line 44 may be any type of optical line.

In one embodiment, the transmission line 44 and the optical system 40 extend along an outer surface of the casing string 14 and are coupled to the casing string 14 by one or more bands 46 that extend around the casing string 14. A protective covering 48 may be installed over the transmission line 44 at each of the couplings 20 of the casing string 14 to prevent the transmission line 44 from being pinched or sheared by the coupling's 20 contact with a wall of the borehole 16. The bands 46 may be located anywhere along the coupling 20, for example, on either side of the coupling 20. In one or more embodiments the transmission line 44 and the optical system 40 are strapped to the outside of the production tubing string 24. Rather than exiting the well 10 from the annular space outside the casing, the transmission line 44 may exit through an appropriate port, for example, a port of a "Christmas tree" assembly. The bands 46 may also bind the transmission line 44 to the outer surface of the production tubing string 24. In one or more embodiments, the optical system 40 may have a coupled transmission line 44 suspended inside production tubing string 24. In one or more embodiments, the optical system 40 and transmission line 44 may be deployed within the borehole 16 using a wireline where the wireline may be permanent or temporary (for example, suspended from a wireline truck). One or more embodiments may utilize composite tubing with one or more optical fibers embedded in the wall of the tubing. The composite tubing may be employed as a casing or a production string, or any combination thereof. A coupling or terminator may be utilized at the end of the composite tubing to couple an optical system 40 to the embedded optical fiber.

In one or more embodiments, the transmission line 44 terminates at a surface interface 42 where the surface interface 42 may include an optical port adapted for coupling the transmission line 44 to a light source and a detector. In one or more embodiments, the transmission line 44 may terminate directly at an information handling system 60 that is coupled to or includes a light source and a detector. In one or more embodiments, the light source, the detector or any combination thereof may be positioned downhole and coupled to the surface interface 42 via one or more electrical conductors, or stored on built-in memory to be analyzed after extracting the system (for temporary installations).

The electrochemical optical sensor system may include an information handling system 60 coupled to the surface interface 42 to control the light source and detector. The information handling system 60 may be an embedded computer permanently or semi-permanently installed as part of the surface interface 42, a portable (for example, desktop or notebook) computer that is coupled to the surface interface 42 as is suitable to collect downhole data, a remote computer coupled to the surface interface 42 via a wireless link, a wired computer network, a mobile phone, a personal digital assistant (PDA), or any other computing device having a suitable I/O interface for receiving the downhole data. The information handling system 60 is adapted to receive the electrical output signal produced by the surface interface 42 and to responsively determine one or more downhole parameters or conditions based, at least in part, on the return signal associated with one or chemical species in the fluid 28. For example, the information handling system 60 may determine a given property (for example, chemical species or ion concentration), a given chemical species concentration, a rate or accumulation of scale buildup on one or more components of the casing string 14, a corrosion rate or total loss due to corrosion occurring on one or more components of the casing string 14, an estimated useful life of one or more components of the casing string 14 subject to scale buildup or corrosion, or any combination thereof. The information handling system 60 may communicate any one or more determinations via a graphical or text-based output device, printer, scanner, electronic mail, audible or visual alarm indicator, via a mobile communications protocol, or by any other communications or technique suitable to convey the one or more determinations. In one or more embodiments the information handling system 60 may store the one or more determinations in any suitable manner and in any suitable format, display one or more stored determinations as log data, make available the one or more determinations to one or more applications, provide the one or more determinations to one or more models, or provide the one or more determinations to any other method or system. In one or more embodiments the information handling system 60 may be temporarily installed at the surface 2, remotely located downhole, or located at any other suitable location.

Figure 7:
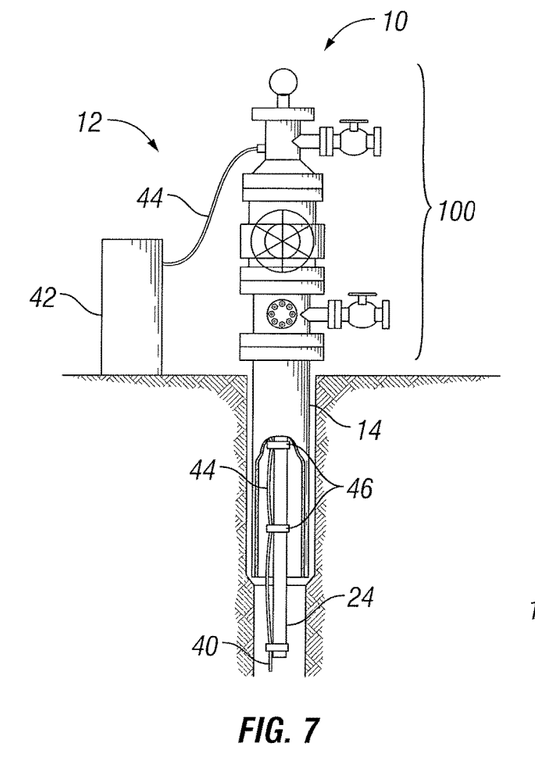
FIG. 7 is a diagram illustrating an example electrochemical optical sensor system, according to one or more aspects of the present disclosure.

FIG. 7 is a diagram illustrating an example electrochemical optical sensor system, according to one or more aspects of the present disclosure. A downhole electrochemical optical sensor system 12 comprises a transmission line 44 strapped to the outside of the production tubing string 24 rather than the outside of casing string 14. Rather than exiting the well 10 from the annular space outside the casing, the transmission line 44 exits through an appropriate port in the "Christmas tree" 100, for example, the assembly of valves, spools and fittings connected to the top of the well 10 to direct and control the flow of fluids to and from the well 10. The transmission line 44 extends along the outer surface of the production tubing string 24 and is held against the outer surface of the production tubing string 24 at spaced apart locations by one or more bands 46 that extend around the production tubing string 24. Similar to the illustration in FIG. 1, the downhole electrochemical optical sensor system 12 of FIG. 3 includes an optical system 40 in contact with formation fluid at the bottom of a borehole and coupled to the interface 42 via the transmission line 44.

Figure 8:
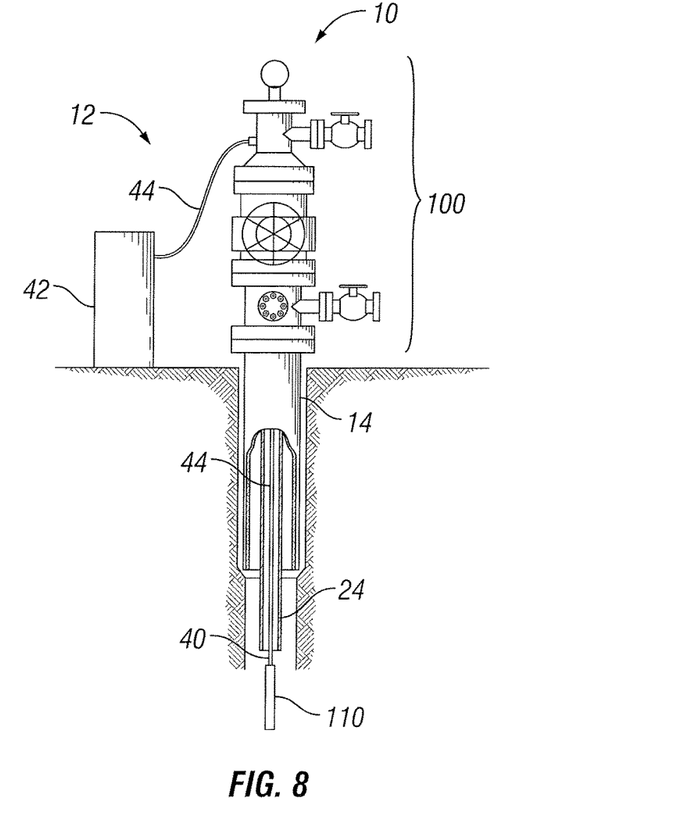
FIG. 8 is a diagram illustrating an example electrochemical optical sensor system, according to one or more aspects of the present disclosure.

FIG. 8 is a diagram illustrating an example electrochemical optical sensor system, according to one or more aspects of the present disclosure. A downhole electrochemical optical sensor system 12 comprises a transmission line 44 suspended inside production tubing string 24. A weight 110 or other conveyance mechanism is employed or utilized to deploy, anchor or both the transmission line 44 within the production tubing string 24 to minimize risks of tangling and movement of the transmission line 44 from the predetermined or desired location. The optical system 40 may be positioned or disposed at the bottom of the well near weight 110. The transmission line 44 exits the well 10 via an appropriate port in the Christmas tree 100 and attaches or engages with the interface 42.

One or more embodiments employ composite tubing (not shown) with one or more optical fibers of the transmission line 44 embedded within the wall of the composite tubing. The composite tubing may be employed as the casing, the production string, or both. A coupling or terminator may be provided at the end of the composite tubing to couple an optical system 40 to the embedded optical fiber. In one or more embodiments, a light source, light detector or both may be positioned downhole and coupled to the interface 42 via electrical conductors.

Figure 2:
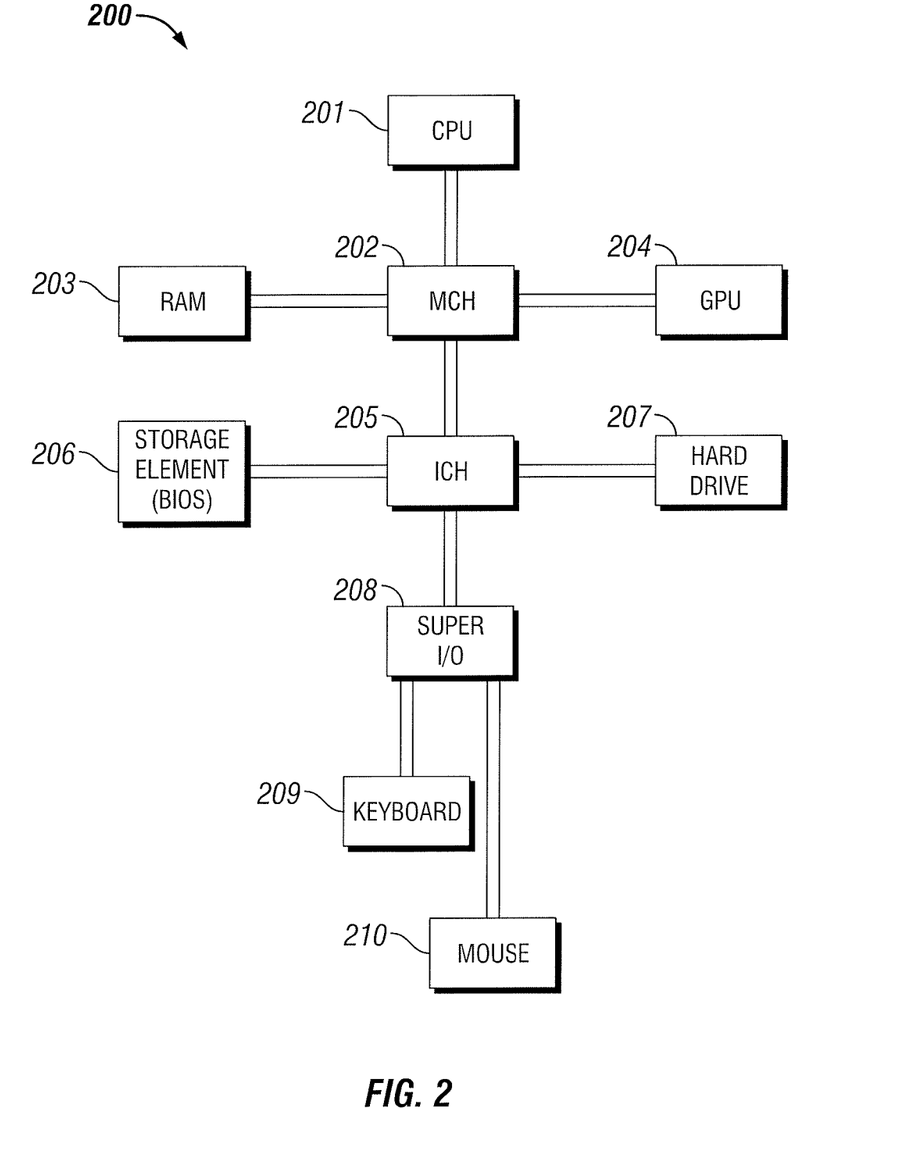
FIG. 2 is a diagram illustrating an example information handling system, according to aspects of the present disclosure.

FIG. 2 is a diagram illustrating an example information handling system 200, according to aspects of the present disclosure. The information handling system 60 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

Figure 4A:
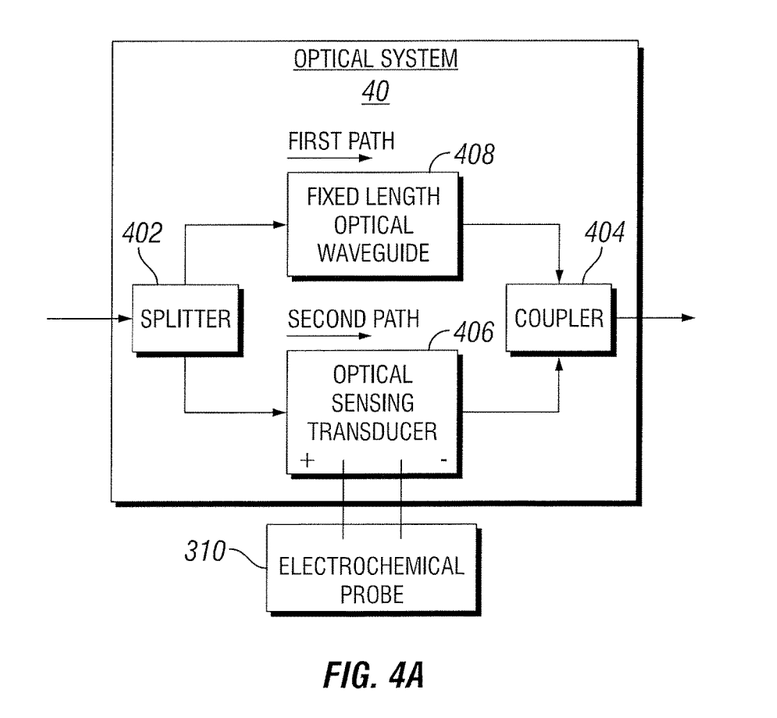
FIG. 4A is a diagram illustrating an example optical system for electrochemical sensing of one or more chemical species according to aspects of the present disclosure.

FIG. 3 is a diagram illustrating an example optical system environment for electrochemical sensing of one or more chemical species, according to aspects of the present disclosure. A light source 302 is coupled to an optical system 40. In one or more embodiments the light source 302 couples to the optical system 40 via a transmission line 44. In one or more embodiments, the optical system 40 may comprise a light source 302. In one or more embodiments, the light source 302 may be a laser (for example, a stretched fiber laser, distributed fiber laser or a vertical-cavity surface-emitting lasers (VCSEL)), a light emitting diode (LED), a semiconductor laser diode, a white light source (for example, a quartz halogen lamp), a monochromatic light source, any other suitable light sources, or any combination thereof. The light source 302 transmits light (for example, a source optical light or a source optical signal) along the transmission line 44 to the optical system 40. An electrochemical probe 310 induces a potential at the optical system 40 which causes the optical system 40 to alter the light to provide some indication of a property (such as a given chemical species concentration), for example, as illustrated in FIG. 4A. The potential may be based, at least in part, on the calibration of the electrochemical probe 310 for one or more types of fluids. The optical system 40 returns light along the transmission line 44 to the surface interface 42 where the returned light or modulated output 304 is communicated or transmitted to an optical detector 308. For example, the returned light may be communicated to the optical detector 308 via an optical port. The optical detector 308 responsively produces an electrical output signal indicative of the concentration of a given chemical species in the fluid 28. In one or more embodiments, the optical port may be configured to communicate the light from the light source 302 via one or more optical fibers of transmission line 44 and to receive the returned light via a different one or more optical fibers of transmission line 44. In one or more embodiments, a plurality of transmission lines 44 may be utilized such that a given transmission line is dedicated for transmissions from the surface 2 to the optical system 40 and a dedicated line is used for transmissions from the optical system 40 or the optical detector 308 to the surface 2.

In one or more embodiments, any one or more of the components of FIG. 3 may be within a single device. For example, in one embodiment, the optical system 40 and the electrochemical probe 310 may be within a single device or the optical system 40, the electrochemical probe 310, and the optical detector 308 may be within a single device. In one or more embodiments, the optical system 40 may store any information or data downhole and transmit the information or data upon request or at a timed interval or the stored information or data may be extracted after retrieval of the optical system 40. The information or data may be conveyed in any number of ways including, but not limited to, via a wired connection, wireless telemetry, or mud pulse signals. In one or more embodiments any one or more of the components of FIG. 3 may be deployed via a wireline tool, an LWD tool, an MWD tool, an intermediate depth ice-core drilling system, a cement monitoring system, any other suitable mechanism, any other downhole tool or any combination thereof. In one or more embodiments, the components of FIG. 3 may be implemented as an array of subsystems, each composed of different ion sensing electrochemical probes 310. For example, in one or more embodiments, a plurality of electrochemical probes 310 and a plurality of optical systems 40 may be deployed at different locations downhole. In one or more embodiments, any component of FIG. 3 may be retrievable or may be used long term or permanently in a downhole deployment or operation.

Both multifunction and multiplexing capabilities are available with the components shown in FIG. 3. "Multifunction" is used herein to describe the capability of the electrochemical optical sensor system to enable different combinations in the amount of electrochemical probes 310 and/or optical systems 40 to be connected and used for electrochemical sensing. For example, the electrochemical sensing system may be composed of one electrochemical probe 310 coupled to one optical system 40; a plurality of electrochemical probes 310 coupled to one optical system 40; one electrochemical probe 310 coupled to a plurality of optical systems 40 or any combination thereof. The amounts of modulated output 304 from the optical system 40 will reflect the combination in the amounts of components used in the configuration chosen. The different combinations in the number of electrochemical probes 310 and/or optical systems 40 may serve different sensing capability purposes. For example, with a configuration comprising a plurality of electrochemical probes 310 coupled to an optical system 40, each electrochemical probe 310 of the plurality may be made sensitive to a particular chemical species, and the output of the electrochemical probe 310 may be tuned (for example, by adding to it a voltage offset) so as to control the optical system 40 within a given voltage range, and thereby permit the chemical species to be independently identified. Furthermore, it may be that one electrochemical probe 310 may be used to detect more than one type of chemical or chemical species; the one electrochemical probe 310 may, for example, be calibrated to detect two or more electrochemical properties.

Multiplexed sensing capability may also be provided by deploying certain components (for example, the electrochemical probe 310 or optical system 40, the electrochemical probe 310 and optical system (40), or any combination thereof along with any one or more of the other components shown in FIG. 3) at different locations and detecting one or more chemical species at different locations downhole by various methods of interrogation. For example, in one or more embodiments, wavelength-dependent components may be used for the optical system 40, which would help distinguish one detection site versus another in an array of subsystems. This technique may be referred to as wavelength division multiplexing. Other methods of distinguishing between different detection sites include, but are not limited to, frequency division multiplexing and time division multiplexing. Any one or more embodiments described in this disclosure may be configured to be compatible with any suitable interrogation methods. Furthermore, multifunction systems (as described above) may also be multiplexed for certain operations.

FIG. 4A illustrates an optical system for electrochemical sensing of one or more chemical species, according to one or more aspects of the present disclosure. The optical system 40 may comprise any one or more of a splitter 402, a combiner 404 and an optical sensing transducer 406. An electrochemical probe 310 provides a potential to the optical sensing transducer 406. In one or more embodiments, the electrochemical probe 310 may be included within the optical system 40. In one or more embodiments, light source 302 may provide light to transmission line 44 and the resulting output from the optical system 40 may be transmitted to the surface 2 along the same fiber of transmission line 44. In such an embodiment, the light traveling through the optical system 40 reaches a mirrored or polished core that reflects a portion of the light incident on it back along the transmission line 44. In such an embodiment, the combiner 404 is not necessary. In one or more embodiments, transmission line 44 is a fiber optic cable and a coupler may comprise splitter 402 and combiner 404 or a first coupler may comprise splitter 402 and a second coupler may comprise combiner 404.

In one or more embodiments, the splitter 402 splits the light from the light source into two paths. A first path is coupled to the combiner 404. The first path may experience a fixed time delay. In one or more embodiments, the splitter 402 may comprise a coupler. For example, a fixed length optical waveguide 408 may generate a reference optical signal from the split light received from the splitter 402. The fixed length optical waveguide 408 may comprise a fiber interferometer or free space. The fixed length optical waveguide 408 may be within the splitter 402 or coupled to the splitter 402. The fixed length optical waveguide 408 may comprise at least one of an optical fiber, an integrated optical circuit, free space, a hollow waveguide, or an optical sensing transducer 406 that is not receiving a driving signal. In one or more embodiments, the optical system 40 does not include a fixed length optical waveguide 408. In one or more embodiments, a first path is not necessary. For example, if the optical sensing transducer 406 is a laser (such as a distributed feedback (DFB) laser attached to a piezoelectric stretcher, the voltage from the electrochemical probe 310 may be fed to the piezoelectric stretcher, and that transducer would stretch, contract, or otherwise alter the length of the attached laser, thereby modulating the output light from the laser, which results in a shifting of the frequency of the output light. Thus, there is no need for a reference optical path. In one or more embodiments, a fiber laser or a fiber Bragg grating coupled or mounted on a transducer may also be examples of optical elements that do not require a reference optical path and likewise do not require a splitter and combiner. For the laser, the light source is the pump of the laser and for the fiber Bragg grating, the light source may be, for example, a broadband source or a tunable laser source. In one or more embodiments, an interferometer may comprise the optical sensing transducer 406 where the interferometer is placed in the second path and where the interferometer contains a fixed length path. In one or more embodiments, the optical system 40 may comprise only the optical sensing transducer 406.

A second path is coupled to the optical sensing transducer 406 where the optical sensing transducer 406 may generate a sensing optical signal or sensing signal. The second path may experience a variable time delay. The second path is coupled to the combiner 404. The combiner 404 combines the reference optical signal and the sensing optical signal to produce an output signal or a modulated signal 304. In one or more embodiments, the optical system 40 comprises a variable fiber optic attenuator coupled to the second path. In one or more embodiments, the variable fiber optic attenuator may be used within an interferometer with a reference arm and a variable arm. The variable fiber optic attenuator may change the amplitude (as opposed to the phase) of the light of the second path. In one or more embodiments, the variable fiber optic attenuator may not be within an interferometer in which case a reference signal is not necessary as the fiber optic attenuator may change the amplitude of the total light traversing it.

The electrochemical probe 310 may include a potentiometric sensing cell with an ISE or ISFET that has an ion selective membrane. The ion selective membrane may be designed in such a manner as to obtain ion selectivity using ISE and ISFET probes. Typically, the ISE or ISFET based measurements involve the potential detection with a potentiometer, whose output is related to the activities of a specific ion in a test solution. Theoretically, the voltage is dependent on the logarithm of the ionic activity, according to the Nernst equation:

$$V_{probe} = V^0 + 2.303 \frac{RT}{nF} \log[M].$$ [Equation 1]

Here $V_{probe}$ represents the measured potential, $V^0$ is a constant which is a characteristic of the particular ion selective electrode measurement or reference electrode pairs, R is the universal gas constant, T is an absolute temperature, n is the charge on the ion, M is the concentration or activity of the ion and F is the Faraday constant (the magnitude of electric charge per mole of electrons). The constant F may have the generally accepted value of 96485.3365 C/mol. The constant F is related to two other fundamental constants, $F=eN_A$, where e is the magnitude of the electron charge and $N_A$ is the Avogadro number. By reading the output voltage value, the specific ion concentration (related to the ion activity) may be obtained in the testing sample solution. The output voltage from the electrochemical probe 310 may be in the millivolt (mV) range; hence, the potentiometer needs to be very sensitive to achieve high detecting resolution. However, conveying the electric potentiometer output when using ISE and ISFET probes may prove difficult. In one or more embodiments of the present disclosure, a potentiometer is replaced with optical system 40 and optical detector 308 such that the detected electrical signal from the electrochemical probe 310 is transferred to an optical signal where it may be stored, transmitted optically to the surface through the transmission line 44, or otherwise processed.

The optical sensing transducer 406 is coupled to the electrochemical probe 310 so as to receive a potential signal generated by the electrochemical probe 310. The optical sensing transducer 406 may comprise a phase modulator that generates a sensing optical signal based, at least in part, on the potential signal from the electrochemical probe 310. In one or more embodiments, the phase modulator may comprise a piezoelectric fiber optic stretcher or a fiber attached to a strain device, such as a magnetostrictive transducer. The potential signal is based, at least in part, on a calibration of the electrochemical probe 310 to a predetermined or preselected property of the fluid to which the electrochemical probe 310 will be exposed to during operation. The optical sensing transducer 406 may directly convert the potential signal to an optical parameter or the optical sensing transducer 406 may be indirectly driven by a transducer that responds to the potential signal. The output from the optical sensing transducer 406 is fed to a combiner 404 which combines the output of a first path from the splitter 402 to produce an optical system output (for example, a modulated output 304). The optical sensing transducer 406 may convert the electrical signal (for example, a voltage or a current) into any different physical or chemical parameters that may be detected with a sensor, such as, strain, temperature, vibration, acoustic, refractive index, magnetic field, optical light or any other suitable parameter. Any one or more properties of the fluid may include, or is based on, ion concentration, a chemical species, an atomic interaction, a molecular interaction, or any other suitable property of the fluid which creates a potential, current, or impedance change to the electrochemical probe 310. In one or more embodiments, the electrochemical probe 310 is calibrated based on two or more ion concentrations.

In one or more embodiments, an optical system 40 does not include an optical sensing transducer 406. For example, the optical system 40 may comprise a light source 302 coupled to the electrochemical probe 310. The potential from the electrochemical probe drives the light source 302. The light source 302 outputs a modulated output 304 based, at least in part, on the potential. In one or more embodiments, reflection based measurement may be utilized. In one or more embodiments, the light source is directly driven by the electrochemical probe 310 downhole.

In one or more embodiments a voltage to frequency converter (VFC) may convert the direct current (DC) potential from the electrochemical probe 310 to an output signal (either voltage or current) which oscillates at a frequency related to the input potential. The frequency may be proportional to the magnitude of the voltage from the electrochemical probe 310. This output signal (which oscillates at a particular frequency) may be converted to a modulated optical signal by controlling a certain optical sensing transducer 406 with the output of the VFC. The optical system output (or modulated output 304) may then be conveyed to the optical detector 308 where the optical detector 308 may be downhole or at the surface 2. The VFC output signal may also drive a light source, such as, an LED. A VFC may be any type of device that converts an input potential into an output signal that oscillates at a frequency that is related to the input potential, such as, a variable frequency oscillator, a voltage controlled oscillator, or any other suitable device. The optical detector 308 generates a measurement based, at least in part, on a parameter associated with the modulated signal.

In one or more embodiments, an electrochemical probe 310 comprises a plurality of specie-specific chemically sensitive cells, which each independently generates a DC potential proportional to specie concentration. This potential may be converted to a time-varying signal with a frequency (either by having a designated VFC circuit, or sharing a VFC circuit with all other DC potentials, or by a combination of the two options) that is related to the input potential. The frequency of each signal may be species-dependent (if tuned to a particular frequency band) and is a measure of the chemical concentration (for example, the chemical concentration is related to the input potential and so will modify the output signal frequency of the VFC). In one or more embodiments, signals from unique specie-specific cells may be combined electrically across the optical sensing transducer 406. This combination may be realized such that the oscillating signal's frequency bands do not overlap, thereby creating a "comb" of oscillating signals that permits independent chemical species to be identified. For example, the VFC corresponding to a sodium cell may be pre-set to oscillate at a low frequency range while the VFC corresponding to a potassium cell may be pre-set to a high frequency range. The independent signal frequencies within the corresponding frequency bands of these three chemicals indicate respective concentration levels. Electronic digital filtering may then be applied after detection, for example, by system control unit 104 or any other information handling system, to separate the frequencies prior to individual DC rectification to extract the respective concentrations.

The output from the optical system 40, for example, the modulated signal 304, may be conveyed as an intensity, a wavelength, a frequency, a phase, a polarization, or any other way known to one of ordinary skill in the art. The optical system 40 may comprise one or more of any type of sensor, a fiber interferometer, a fiber Bragg grating, long period fiber grating, a fiber resonator, a fiber laser, a variable attenuator, an acousto-optic modulator (which can change either or both the intensity and the frequency of light), a phase modulator, various light sources (for example, light source 302) or any other components and configuration known to one of ordinary skill in the art. In one or more embodiments, the measurement from the optical detector 308 is transmitted to an information handling system 60 which may determine a property, such as, an ion concentration or a chemical species, of a fluid 28 based, at least in part, on the measurement received from the optical detector 308. Any number of properties (for example, chemical species or ion concentrations) may be determined based on the calibration of the electrochemical probe 310. The information handling system 60 may also generate a log for display at a display of the information handling system 60 where the log represents or is based, at least in part, on one or more measurements, one or more determined properties, one or more determined ion concentrations, one or more determined chemical species, one or more other determined downhole parameters, or any combination thereof. One or more downhole operations may be scaled or adjusted based, at least in part, on the generated log, the one or more determined properties, the one or more determined ion concentrations, the one or more determined chemical species, the one or more other determine downhole parameters, or any combination thereof. In one or more embodiments, the information handling system 60 may cause the light source 302 to generate a source optical signal at timed intervals, continuously, upon the occurrence of a specified event or occurrence, according to one or more received or determined downhole parameters, or at any other suitable time according to a specific operation.

In one embodiment, the electrochemical probe 310 is an ISE/ISFET probe. In one embodiment, the voltage signal or potential provide by the electrochemical probe 310 (the ISE/ISFET probe) is converted into an optical signal. The optical sensing transducer 406 may be a phase modulator, for example Lithium Niobate or Potassium Dihydrogen Phosphate) that converts the potential from the electrochemical probe 310 (that has been exposed to the fluid 28) in response to the ion concentration into an optical phase change. A calibration process may be necessary to achieve accurate results.

In one or more embodiments, the optical system 40 comprises an interferometer. In one or more embodiments, the optical system 40 may comprise a Mach-Zehnder interferometer, a Michelson interferometer, a Sagnac interferometer, or a Fabry-Pérot interferometer. A Michelson interferometer utilizes a component that comprises a splitter 402 and a combiner 404 or a coupler (when transmission line 44 is a fiber optic cable) and two arms. Mirrors at the end of the arms reflect light back from the splitter of the coupler, for example. One arm is the reference arm and the other arm contains the optical sensing transducer 406 that changes the phase of the source signal to produce a sensing signal.

A light source 302 transmits a source signal (for example, a fiber optic signal) via transmission line 44 (for example, a source optical signal) that is received by the optical system 40. In one or more embodiments, a splitter 402 of the optical system 40 receives the signal. The splitter 402 may comprise a coupler. The splitter splits the signal into two paths. A first path acts as a fixed time delay. The first path may include a fixed length optical waveguide 408 that generates a reference optical signal from the split signal of the first path. For example, in one or more embodiments, the reference optical signal is a fixed phase delay signal. The fixed length optical waveguide 408 may comprise any one or more of an optical fiber, an integrated optical circuit, free space, a hollow waveguide, or any other suitable component. The second path directs the split signal to an optical sensing transducer 406, for example, a phase modulator such as a Lithium Niobate or a Potassium Dihydrogen Phosphate amplitude and phase modulator, to generate a sensing signal. The optical sensing transducer 406 couples to an electrochemical probe 310, for example, an ISE/ISFET probe. The electrochemical probe 310 is exposed to a fluid. In one or more embodiments, the electrochemical probe may be exposed to a fluid 28. The fluid 28 may comprise a fluid from one or more other wells, a tracer fluid, a formation fluid, water, mud, or any other downhole fluid. For example, in one or more embodiments, a tracer chemical is injected into a fluid, the electrochemical probe is exposed to the fluid, and based, at least in part, on this exposure, an identification of the well associated with the fluid may be determined. Exposure of the electrochemical probe 310 to a fluid 28 creates a potential at the optical sensing transducer 406. When a specific output voltage exists from the electrochemical probe 310 due to a property of the fluid, for example, to different ion concentrations of a fluid 28, the applied voltage on the optical sensing transducer 406 modifies the refractive index of the associated crystal, for example, an $LiNbO_3$ crystal, leading to a phase shift between the reference signal and the sensing signal (the outputs of the two paths). In one embodiment, when the output voltage from the electrochemical probe 310 is zero, the sensing signal and the reference signal are combined at combiner 404 which is coupled to optical sensing transducer 406 (for example, a phase modulator) and the fixed length optical waveguide 408. The modulated output from the combiner 404 for an intensity-modulating component based on a Mach-Zehnder interferometer with $LiNbO_3$ as the phase modulator may follow the cosine function:

$$P_{output} = \frac{P_{input} \propto}{2}\left[1 + \cos\left(\frac{V_{probe}}{V_\pi}\pi\right)\right] \quad \text{[Equation 2]}$$

where $P_{output}$ and $P_{input}$ are output and input optical powers, respectively, $V_{probe}$ is the output voltage from the electrochemical probe 310, $V_\pi$ is the half-wave driving voltage and $\propto$ is the insertion loss of the optical sensing transducer 406. Any one or more embodiments, comprising any one or more elements may produce a different output.

Based on Equation 2, the output power received at the optical detector 308 has a cosine function. An inherent concern may exists regarding the ambiguity of the signal (the modulated output) received at the optical detector 308. To overcome this concern, the modulated output may be finely controlled by the ratio of $V_{probe}$ and $V_\pi$. For example, the voltage output from the electrochemical probe 310 is very small, and may be of the order of tens or hundreds of millivolts, as illustrated by Equation 1. For Equation 1 when n=1, at room temperature, for decade ion concentration change, an approximately result should be about 59 mV output voltage change. The resulting maximum $V_{probe}$ variation may be smaller than 1 volt (V) as long as the design of the optical sensing transducer 406 is designed with a $V_\pi$ larger than 1V which provides for an unambiguous measurement from the optical detector 308.

In one or more embodiments, contributions from other measureable parameters, such as temperature, acoustics, strain, may also pose a concern for the accuracy of the electrochemical measurement. The interferometer may need to be designed to compensate or eliminate these contributions. For example, a temperature induced signal drift may be compensated for by designing the two paths to have the same material-made waveguides 408 with the same thermal expansion and thermos-optical coefficient, such that the temperature variation would not affect the sensor performance. In another example, two identical optical systems 40 may be placed together where one uses the voltage of a reference electrochemical probe (used for temperature-dependent response) applied to it (or no voltage applied to it) and the other having the electrochemical probe 310 of interest connected to it. For example, in a phase modulator, there may be some phase shift associated with temperature. If a phase modulator is located in both paths of the interferometer but one is not connected to an electrochemical probe 310 (or connected to a reference electrochemical probe), then the same temperature related shift is experienced in both paths of the interferometer but the additional phase shift in one path is indicative of the property (for example, the chemical measurement or the ion concentration) of the fluid 28. The temperature induced drift may then be eliminated by using the two sensors. In another example, the two sensors are calibrated before each measurement using standard solutions such that the modulated signal output is obtained within a short time period, for example, minutes, after calibrations, thereby making the temperature-induced drift is negligible (as typically temperature variations are typically very slow). Similar techniques may be used to decrease other slowly varying parameter induced noises. Similar compensation techniques may be applied, for example, to an optical system 40 utilizing VFCs where the electrochemical probe 310 may be calibrated beforehand for a temperature response, and reference VFCs may be added to a detection system in order to track the temperature-dependent response of the VFCs within the measurement environment for compensation.

In one embodiment the optical sensing transducer 406 comprises an intensity modulator Mach-Zehnder interferometer directly based on an electro-optic modulator, for example, EOM, JDSU OC-192. The light source 302 comprises a semiconductor laser, for example, a laser from RIO, Inc., located inside a container, such as a TDI 7000 box. In such an embodiment, the optical detector 308 comprises a power meter. The electrochemical probe 310 comprises an ion selective electrode (a pH probe), for example, from Thermo-Scientific. The output of the electrochemical probe 310 may be fed into the direct current (DC) port of the phase modulator 406 via any suitable cable. The radio frequency (RF) port of the optical sensing transducer 406 may be loaded with a 50 ohm terminator.

Figure 4B:
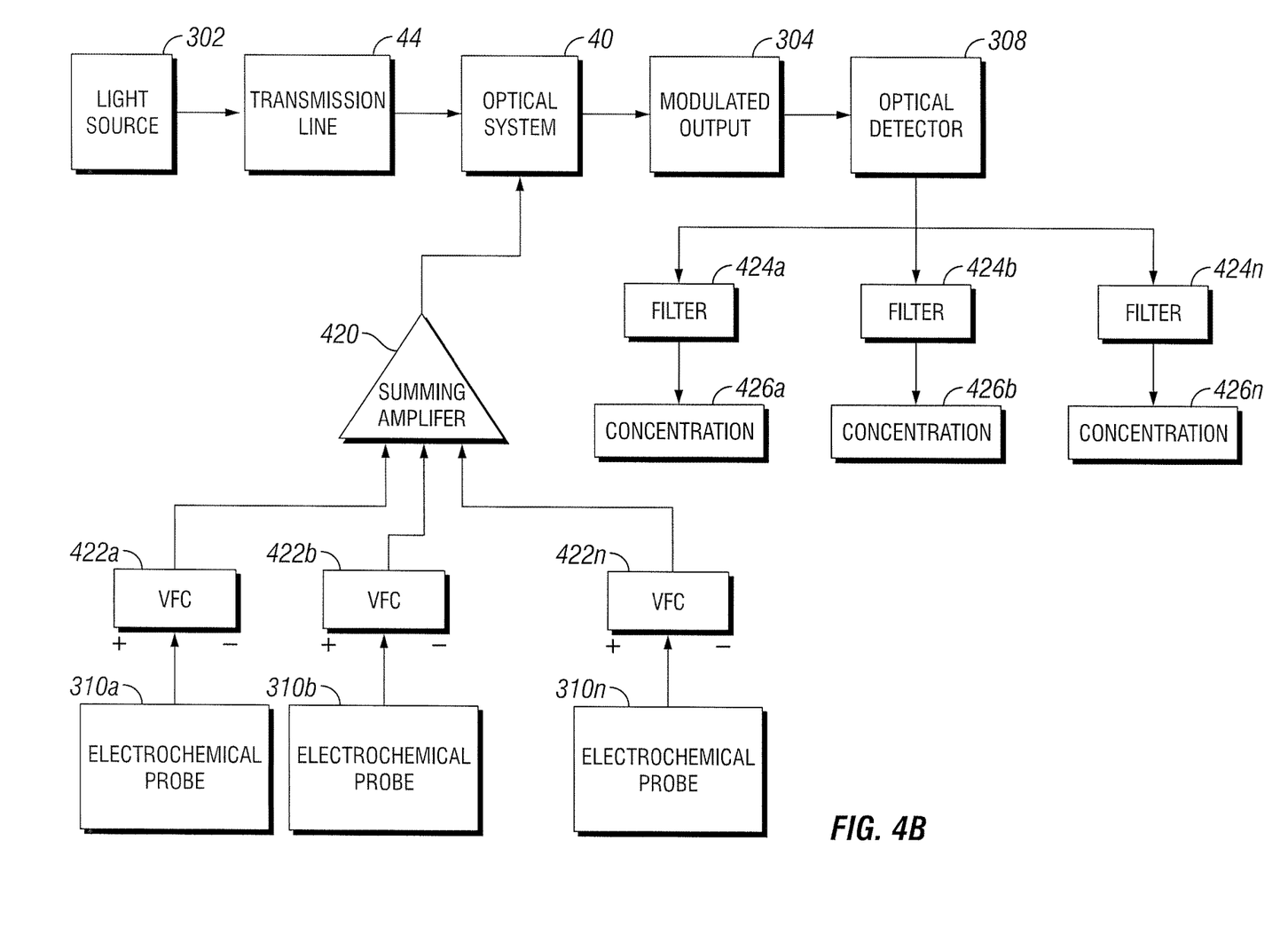
FIG. 4B is a diagram illustrating an example optical system for electrochemical sensing of one or more chemical species according to aspects of the present disclosure.

As described above, a multiplexing approach may also be implemented. For example, a one-to-one frequency division multiplexing approach may be implemented as illustrated in FIG. 4B. A plurality of electrochemical probes 310a, 310b, through 310n may be coupled to corresponding or associated VFC 422a, 422b, and 422n. The electrochemical probes 310 provide a potential to the VFCs 422. The output of each of the VFCs 422 is fed into a summing amplifier 420. The summed signals are then fed into the optical system 40. In one or more embodiments, the optical detector 308 after receiving the modulated output 304 may transmit a signal based, at least in part, on the modulated output 304 to filters 424*a*, 424*b* and 424*n*. The output of each of the filters 424 is then processed to determine a specific concentration 426*a*, 426*b*, and 426*n*, or a property of a fluid or a solution. For example, the output of each of the filters 424 may be processed by an information handling system 200.

Figure 5:
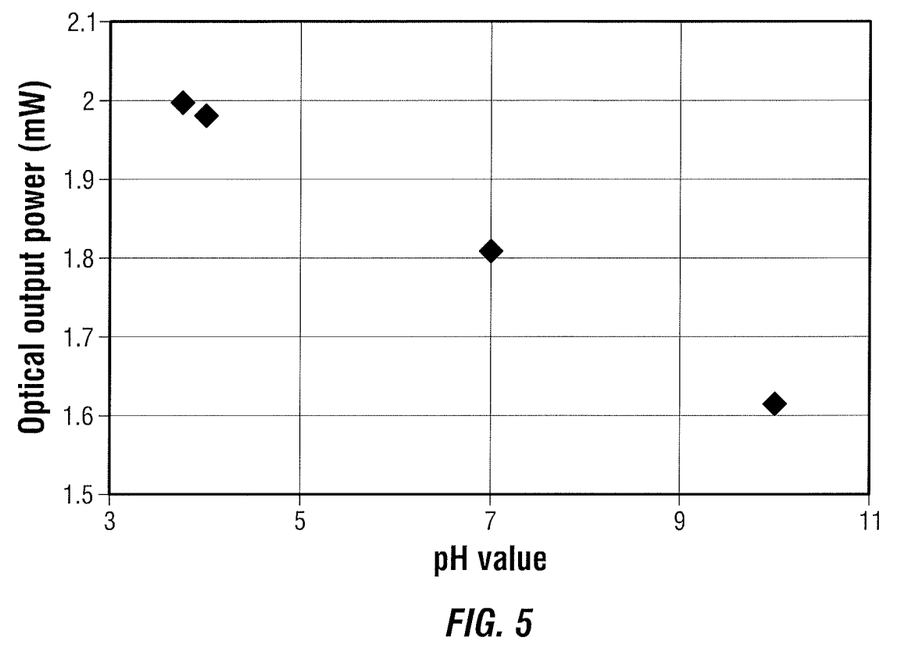
FIG. 5 is a graph illustrating a log according to aspects of the present disclosure.

In one example, three calibration solutions were utilized along with a storage fluid whose PH values are 4, 7, 10 and 3.78. Each power output from the optical detector 308 may be logged and plotted as illustrated in FIG. 5. FIG. 5 illustrates a trend where the optical power (the modulated output) transmitted to the optical detector 308 from the combiner 404 decreases as the pH value gets higher due to the light interference in the optical sensing transducer 406 (a phase modulator comprising an interferometer in this example). As illustrated in FIG. 5, the trend is essentially linear due to the half-wave driving voltage $V_\pi$ of the optical sensing transducer 406 while the output voltage from the electrochemical probe is only about 367 mV. It should be noted that the pH varied from 3.78 to 10). Thus, an essentially linear relationship is observed between the measurement received from the optical detector 308 and the pH value.

Figure 6:
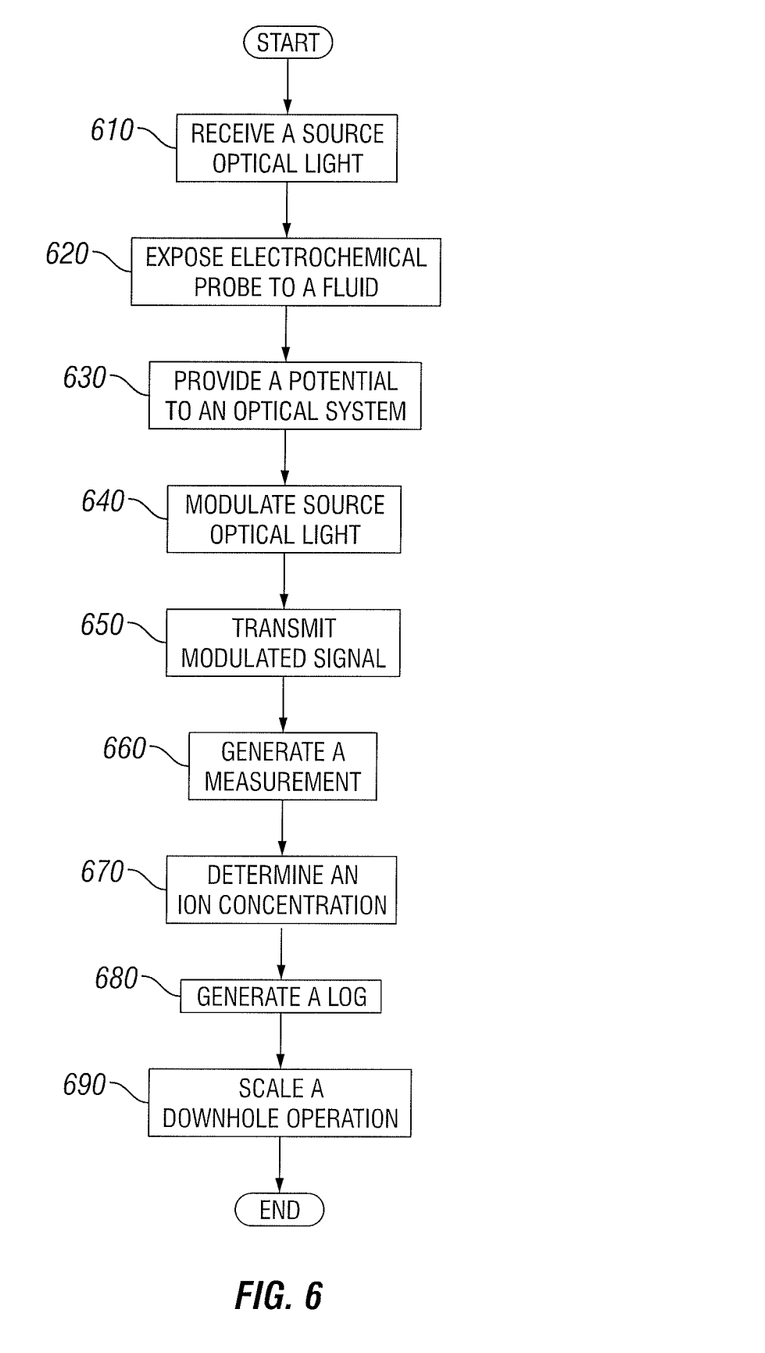
FIG. 6 is a flowchart illustrating a method for electrochemical sensing of one or more chemical species, according to aspects of the present disclosure.

FIG. 6 is a flowchart that illustrates a method for downhole electrochemical sensing of one or more chemical species, according to aspects of the present disclosure. At step 610, an optical system 40 receives a source optical light from a light source 302. In one or more embodiments, the optical system 40 comprises a splitter that splits the source optical light into a first optical signal of a first path and a second optical signal of a second path. A reference optical signal is generated by inducing a fixed phase delay on the first optical signal. The phase of the second optical signal is changed based, at least in part, on the potential from the electrochemical probe 310 as discussed at step 620 to produce a sensing optical signal. At step 620, an electrochemical probe 310 coupled to the optical system 40 is exposed to a fluid 28 where the fluid 28 has a property, for example, an ion concentration or chemical species. At step 630, the electrochemical probe 310 provides a potential to the optical system 40. For example, the potential is provided to an optical sensing transducer, such as a phase modulator or a piezoelectric fiber optic stretcher. The potential is based, at least in part, on a property of the fluid 28. For example, in one or more embodiments, the electrochemical probe 310 is calibrated for one or more types of fluids or a property of a fluid such that when the electrochemical probe 310 is exposed to fluid 28, a corresponding potential is created. For example, in one or more embodiments, the electrochemical probe is calibrated for a specific ion concentration or chemical species.

At step 640, the received source optical light is modulated based, at least in part, on the potential provided by the electrochemical probe 310. For example, in one embodiment, the reference optical signal and the sensing optical signal are combined to produce a modulated output. At step 650, the modulated signal 304 is transmitted to an optical detector 308. At step 660, the optical detector 308 generates a measurement based, at least in part, on a property (for example, a parameter associated with an ion concentration or chemical species) present in the fluid 28. At step 670, the property (for example, the ion concentration or chemical species) present in the fluid 28 is determined based, at least in part, on the measurement. For example, the optical detector 680 may transmit to an information handling system 60 the measurement and the information handling system 60 generates a log or displays the determined property (for example, the ion concentration or chemical species or other identified material or substance) present in the fluid based, at least in part, on the measurement. At step 690, one or more downhole operations are scaled or adjusted or adjusted based on the received measurement or the log.

In one or more embodiments, a downhole chemical sensing system comprises an optical system, an electrochemical probe coupled to the optical system, wherein the electrochemical probe provides a potential to the optical system, wherein the potential is based on a property of a fluid, and wherein the optical system modulates the source optical light based on the potential provided by the electrochemical probe as a modulated output, an optical detector coupled to the optical system, wherein the optical detector receives the modulated output, and wherein the optical detector generates based, at least in part, on a parameter associated with the modulated output, a measurement and an information handling system coupled to the optical detector, wherein the information handling system receives the measurement from the optical detector and determines based, at least in part, on the measurement. In one or more embodiments, the downhole chemical sensing system further comprises a light source, wherein the light source generates the source optical light, and wherein the optical system receives the source optical light from the light source. In one or more embodiments, the optical system of the downhole chemical sensing system comprises a light source, wherein the light source generates the source optical light, and wherein the light source generates the modulated output based, at least in part, on the potential. In one or more embodiments, the optical system of the downhole chemical sensing system comprises a fiber optic cable, wherein the fiber optic cable receives the source optical light, a splitter coupled to the fiber optical cable, wherein the splitter splits the source optical light, a fixed length optical waveguide coupled to the splitter, wherein the fixed length optical waveguide generates a reference optical signal, a phase modulator coupled to the splitter, wherein the electrochemical probe provides a potential to the phase modulator, and wherein the phase modulator generates a sensing optical signal and a combiner coupled to the phase modulator and the fixed length optical waveguide, wherein the combiner combines the reference optical signal and the sensing optical signal to form a measurement optical signal, wherein the measurement from the optical detector is based, at least in part, on the measurement optical signal. In one or more embodiments, the fixed length optical waveguide of the downhole chemical sensing system comprises at least one of an optical fiber, an integrated optical circuit, free space, a phase modulator not driven by a potential, and a hollow waveguide. In one or more embodiments, at least one of the fixed length optical waveguide and the phase modulator of the downhole chemical sensing system comprises at least one of a fiber interferometer or free space. In one or more embodiments, the phase modulator of the downhole chemical sensing system is a piezoelectric fiber optic stretcher. In one or more embodiments, the phase modulator of the downhole chemical sensing system comprises at least one of a Lithium Niobate modulator or a Potassium Dihydrogen Phosphate modulator. In one or more embodiments, the electrochemical probe of the downhole chemical sensing system comprises at least one of an ion selective electrode probe, an ion selective field-effect transistor probe, or a plurality of oscillation frequency chemical specie specific cells. In one or more embodiments, the optical system comprises at least one of an interferometer, a fiber Bragg grating, a variable attenuator, an acousto-optic modulator and a laser. In one or more embodiments, the optical system of the downhole chemical sensing system comprises a plurality of optical systems and an associated plurality of electrochemical probes, and wherein the plurality of optical systems and the plurality of electrochemical probes are located at different downhole locations. In one or more embodiments, the downhole chemical sensing system further comprises a downhole tool, wherein the topical system is deployed via the downhole tool.

In one or more embodiments, a method of downhole chemical sensing comprises receiving at an optical system a source optical light from a light source, exposing an electrochemical probe to a fluid, providing, by the electrochemical probe, a potential to the optical system, wherein the potential is based on a property of a fluid, modulating the received source optical light based on the potential provided by the electrochemical probe as a modulated output, transmitting to an optical detector, by the optical system, the modulated output, generating, by optical detector, a measurement based, at least in part, on a parameter associated with the modulated output, determining a property of the fluid based, at least in part, on the measurement and displaying a log, wherein the log comprises the determined property of the fluid. In one or more embodiments, the method of downhole chemical sensing further comprises splitting, by the optical system, the source optical light into a first optical signal and a second optical signal, inducing a fixed phase delay on the first optical signal to produce a reference signal, changing the phase of the second optical signal based, at least in part, on a potential received by the optical system from the exposure of the electrochemical probe to the fluid to produce a sensing signal, combining the reference signal and the sensing signal to produce a measurement, determining the property of the fluid based, at least in part, on the measurement, and displaying a log associated with one or more downhole parameters based, at least in part, on at least one of the measurement and the determined property. In one or more embodiments, a splitter splits the source optical light, a fixed length optical waveguide generates the reference optical signal, a phase modulator receives the potential from the electrochemical probe, and wherein the phase modulator generates the sensing optical signal and a combiner combines the reference optical signal and the sensing optical signal. In one or more embodiments, the phase modulator is a piezoelectric fiber optic stretcher. In one or more embodiments, the method of downhole chemical sensing further comprises scaling one or more downhole operations based, at least in part, on the log. In one or more embodiments, the method of downhole chemical sensing further comprises calibrating the electrochemical probe for one or more types of fluids. In one or more embodiments, the optical system comprises a plurality of optical systems, and wherein the plurality of optical systems are located at different downhole locations.

In one or more embodiments, a system for collecting subterranean chemical composition comprises at least one processor and a memory including nontransitory executable instructions that, when executed, cause the at least one processor to transmit to an optical system a source optical light from a light source, wherein an electrochemical probe when exposed to a fluid provides a potential based on a property of a fluid, and wherein the optical system generates a modulated output, receive a measurement from an optical detector wherein the measurement is based on a parameter associated with the modulated output, wherein the modulated output is based on the source optical light and the potential provided by the electrochemical probe, determine the property of the fluid based, at least in part, on the measurement and scale one or more downhole operations based, at least in part, on a log, wherein the log comprises the determined property of the fluid. In one or more embodiments, nontransitory executable instructions, when executed, further cause the at least one processor to display the log. In one or more embodiments, the electrochemical probe is calibrated based on two or more properties of the fluid, and wherein the determining the property comprises determining at least two of the two or more properties of the fluid.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A downhole chemical sensing system comprising:
   an optical system;
   an electrochemical probe coupled to the optical system, wherein the electrochemical probe provides a potential to the optical system, wherein the potential is based on a property of a fluid, and wherein the optical system modulates a source optical light based on the potential provided by the electrochemical probe as a modulated output;
   an optical detector coupled to the optical system, wherein the optical detector receives the modulated output, and wherein the optical detector generates a measurement based, at least in part, on a parameter associated with the modulated output; and
   an information handling system coupled to the optical detector, wherein the information handling system receives the measurement from the optical detector and determines the property of the fluid based, at least in part, on the measurement.

2. The system of claim 1, further comprising a light source, wherein the light source generates the source optical light, and wherein the optical system receives the source optical light from the light source.

3. The system of claim 1, wherein the optical system comprises a light source, wherein the light source generates the source optical light, and wherein the light source generates the modulated output based, at least in part, on the potential.

4. The system of claim 1, wherein the optical system comprises:
   a fiber optic cable, wherein the fiber optic cable receives the source optical light;
   a splitter coupled to the fiber optical cable, wherein the splitter splits the source optical light;
   a fixed length optical waveguide coupled to the splitter, wherein the fixed length optical waveguide generates a reference optical signal;
   a phase modulator coupled to the splitter, wherein the electrochemical probe provides a potential to the phase modulator, and wherein the phase modulator generates a sensing optical signal; and a combiner coupled to the phase modulator and the fixed length optical waveguide, wherein the combiner combines the reference optical signal and the sensing optical signal to form a measurement optical signal, wherein the measurement from the optical detector is based, at least in part, on the measurement optical signal.

5. The system of claim 4, wherein the fixed length optical waveguide comprises at least one of an optical fiber, an integrated optical circuit, free space, a phase modulator not driven by a potential, and a hollow waveguide.

6. The system of claim 4, wherein at least one of the fixed length optical waveguide and the phase modulator comprises at least one of a fiber interferometer or free space.

7. The system of claim 4, wherein the phase modulator is a piezoelectric fiber optic stretcher.

8. The system of claim 4, wherein the phase modulator comprises at least one of a Lithium Niobate modulator or a Potassium Dihydrogen Phosphate modulator.

9. The system of claim 1, wherein the electrochemical probe comprises at least one of an ion selective electrode probe, an ion selective field-effect transistor probe, or a plurality of oscillation frequency chemical specie specific cells.

10. The system of claim 1, wherein the optical system comprises at least one of an interferometer, a fiber Bragg grating, a variable attenuator, an acousto-optic modulator and a laser.

11. The system of claim 1, wherein the optical system comprises a plurality of optical systems and an associated plurality of electrochemical probes, and wherein the plurality of optical systems and the plurality of electrochemical probes are located at different downhole locations.

12. The system of claim 1, further comprising a downhole tool, wherein the optical system is deployed via the downhole tool.

13. A method of downhole chemical sensing, the method comprising:
receiving at an optical system a source optical light from a light source;
exposing an electrochemical probe to a fluid;
providing, by the electrochemical probe, a potential to the optical system, wherein the potential is based on a property of a fluid;
modulating the received source optical light based on the potential provided by the electrochemical probe as a modulated output;
transmitting to an optical detector, by the optical system, the modulated output;
generating, by optical detector, a measurement based, at least in part, on a parameter associated with the modulated output;
determining a property of the fluid based, at least in part, on the measurement; and
displaying a log, wherein the log comprises the determined property of the fluid.

14. The method of claim 13, further comprising:
splitting, by the optical system, the source optical light into a first optical signal and a second optical signal;
inducing a fixed phase delay on the first optical signal to produce a reference signal;
changing the phase of the second optical signal based, at least in part, on a potential received by the optical system from the exposure of the electrochemical probe to the fluid to produce a sensing signal;
combining the reference signal and the sensing signal to produce a measurement;
determining the property of the fluid based, at least in part, on the measurement; and
displaying a log associated with one or more downhole parameters based, at least in part, on at least one of the measurement and the determined property.

15. The method of claim 13, wherein:
a splitter splits the source optical light;
a fixed length optical waveguide generates the reference optical signal;
a phase modulator receives the potential from the electrochemical probe, and wherein the phase modulator generates the sensing optical signal; and
a combiner combines the reference optical signal and the sensing optical signal.

16. The method of claim 15, wherein the phase modulator is a piezoelectric fiber optic stretcher.

17. The method of claim 13, further comprising scaling one or more downhole operations based, at least in part, on the log.

18. The method claim 13, further comprising calibrating the electrochemical probe for one or more types of fluids.

19. The method of claim 13, wherein the optical system comprises a plurality of optical systems, and wherein the plurality of optical systems are located at different downhole locations.

20. A system for collecting subterranean chemical composition, comprising:
at least one processor; and
a memory including non: transitory executable instructions that, when executed, cause the at least one processor to:
transmit to an optical system a source optical light from a light source, wherein an electrochemical probe when exposed to a fluid provides a potential based on a property of a fluid, and wherein the optical system generates a modulated output, wherein the modulated output is based on the source optical light and the potential provided by the electrochemical probe;
receive a measurement from an optical detector wherein the measurement is based on a parameter associated with the modulated output;
determine the property of the fluid based, at least in part, on the measurement; and scale one or more downhole operations based, at least in part, on a log, wherein the log comprises the determined property of the fluid.

21. The system of claim 20, wherein non: transitory executable instructions, when executed, further cause the at least one processor to display the log.

22. The system of claim 20, wherein the electrochemical probe is calibrated based on two or more properties of the fluid, and wherein the determining the property comprises determining at least two of the two or more properties of the fluid.

* * * * *